P. DISMUKES.
CLOVER HARVESTER.
No. 88,144. Patented Mar. 23, 1869.
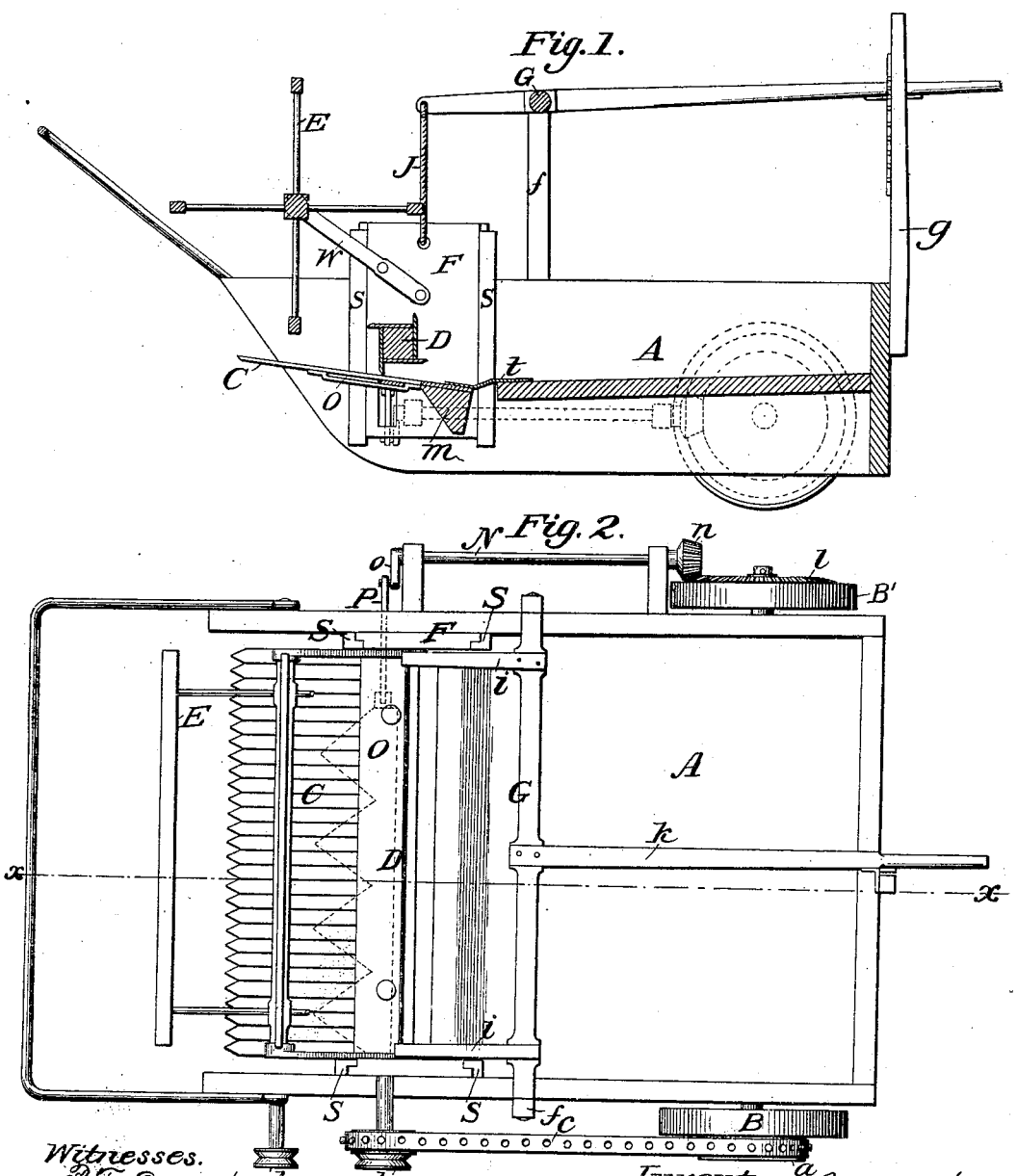

UNITED STATES PATENT OFFICE.

PAUL DISMUKES, OF GALLATIN, TENNESSEE.

*Letters Patent No. 88,144, dated March 23, 1869.*

IMPROVEMENT IN CLOVER-HARVESTERS.

The Schedule referred to in these Letters Patent and making part of the same.

*To all whom it may concern:*

Be it known that I, PAUL DISMUKES, of Gallatin, in the county of Sumner, and State of Tennessee, have invented certain new and useful Improvements in Harvesters for Clover, Grass, Oats, Wheat, Barley, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to certain improvements on the clover-harvester for which Letters Patent were granted to me, bearing date November the 24th, 1868, and numbered 84,416, and consists, first, in mounting the fingers, or comb, the revolving cutter, and the reel, in an adjustable frame; and, second, in attaching a reciprocating sickle-bar on the under side of the fingers, all as hereinafter described.

Figure 1 is a longitudinal vertical section through my improved machine, on the line $x-x$ of fig. 2.

Figure 2 is a top plan view of the same.

In its general construction, the machine is the same as the one previously patented to me, and consisting principally of a body and platform, mounted upon two large driving-wheels, and provided with stationary fingers, revolving cutters, and a reel.

A represents the body of the machine, and

B B', the driving-wheels.

At the front end of the frame A, opposite the end of the platform, I place a frame, F, consisting of the two end-boards, or pieces, connected by a cross-bar, $m$, and sliding up and down between the vertical guides $s$, secured to the frame A, as clearly shown in figs. 1 and 2.

To the cross-bar $m$ of this frame, I secure the stationary fingers, or comb C, and, immediately above it, mount the revolving cutter D, and also a reel, E, supported in arms $w$, secured to the frame F, and projecting forward, as shown in figs. 1 and 2.

The shaft of the cutter D, which projects through and out on one side of the frame, is provided with a double pulley, $b$, consisting of a sprocket-wheel and a grooved pulley, and operated by a belt or chain, $c$, which connects it with the sprocket-wheel $a$, secured to the outside of the driving-wheel B, all as clearly shown in fig. 2.

The reel-shaft E is also provided with a pulley, $d$, and is driven by a cord from the grooved portion of the pulley $b$.

On opposite sides of the body A, back of the frame F, I attach vertical standards, $f$, and mount thereon a horizontal rock-shaft, G, reaching across, above the machine, from side to side, and attach to it, at each end, an arm, $i$, projecting forward, and connected, one to each end of the frame F, by cords or chains $j$; and, near the middle of the said shaft G, attach, rigidly, an arm, or lever, $k$, projecting backward, past the rear end of the machine, and which engages into a rack on the vertical standard $g$, secured to the rear portion of the main frame, all as in figs. 1 and 2, so that the whole frame, containing comb, reel, and revolving cutters, may be moved up or down, as occasion requires, by operating the lever $k$.

To adapt the machine for harvesting the coarser and heavier grasses, and for the different grains, as oats, wheat, barley, rye, &c., I locate, on the under side of the comb C, a reciprocating sickle-bar, O, as shown in the drawings, and which is operated by the pitman $p$, connecting it with a crank, $o$, on one end of a horizontal shaft, N, which shaft has, secured to its opposite end, a bevel-pinion, $n$, meshing into a bevel-wheel, $l$, formed upon, or attached to, or formed on, the driving-wheel B', all as shown.

To cover the space between the rear of the comb and the front side, or edge of the platform, and support the grain which would otherwise fall down through, I provide a canvas or leather apron, $t$, having one side secured to the movable frame, at the rear side of the comb, and the other to the front edge of the platform, as shown in figs. 1 and 2, thus allowing the frame to rise and fall, as required, but always forming a tight joint between it and the frame.

The machine thus constructed is suitable for harvesting any and all kinds of grains and grasses, being especially adapted for operating upon barley, as it avoids handling it three or four times, as in the ordinary machine.

The special advantage of the improvement, when used for harvesting clover, and other grass-seeds, is, that the sickle serves to cut off the large, or strong weeds and stalks which always exist among the grass to a greater or less degree, and which sometimes clog, or stick fast between the fingers of the comb, and either pull up by the roots, or tend to hold the machine, and make it draw heavy.

Having thus described my invention,

What I claim, is—

1. The combination of the reel E, cutter D, and comb C, all secured to the adjustable frame F, and connected to the body of the machine, substantially as shown and described.

2. The combination of the comb C and the reciprocating sickle O, arranged to operate substantially as described.

PAUL DISMUKES.

Witnesses:
  JESSE CAGE,
  JOHN F. WHITE.